US012723553B1

(12) United States Patent
Tidwell et al.

(10) Patent No.: US 12,723,553 B1
(45) Date of Patent: Sep. 1, 2026

(54) GASEOUS FUEL INJECTOR DIAGNOSTICS

(71) Applicant: Cummins Inc., Columbus, IN (US)

(72) Inventors: Michael R. Tidwell, Bloomington, IN (US); Diego Saborio, Columbus, IN (US); Ryan Baize, Columbus, IN (US); Karthik Sethuraman, S Hamilton, MA (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 19/095,190

(22) Filed: Mar. 31, 2025

(51) Int. Cl.
*F02D 41/30* (2006.01)
*F02M 65/00* (2006.01)

(52) U.S. Cl.
CPC ....... *F02D 41/3005* (2013.01); *F02M 65/001* (2013.01)

(58) Field of Classification Search
CPC .......................... F02D 41/3005; F02M 65/001
See application file for complete search history.

(56) References Cited

U.S. PATENT DOCUMENTS 6,125,624 A * 10/2000 Prociw .................. F23K 5/18 60/39.094
6,732,577 B2 5/2004 Leman et al.
7,025,047 B2 4/2006 Leman et al.
7,788,015 B2 8/2010 Tidwell et al.
7,904,233 B2 3/2011 Kweon et al.
7,945,372 B2 5/2011 Geveci et al.
8,375,923 B2 2/2013 Pursifull
8,554,454 B2 10/2013 Hemmerlein et al.
9,334,824 B2 5/2016 Pursifull et al.
9,702,315 B1 * 7/2017 Palmer .................. B60K 35/10
10,161,344 B2 12/2018 Dudar
10,408,154 B2 9/2019 Dudar
10,480,431 B1 * 11/2019 Dudar .................. F02D 41/22
(Continued)

FOREIGN PATENT DOCUMENTS

EP 1359307 11/2023
IN 284739 7/2017
(Continued)

*Primary Examiner* — Joseph J Dallo
(74) *Attorney, Agent, or Firm* — Taft Stettinius & Hollister LLP

(57) ABSTRACT

A system includes an engine, one or more gaseous fuel injectors configured to inject gaseous fuel for combustion by the engine, and an electronic control system configured to perform an engine shutdown, during the engine shutdown measure a first pressure of gaseous fuel supplied to at least a first injector of the one or more gaseous fuel injectors, command a first operation of the first injector comprising a plurality of shorter injection pulses, after the plurality of shorter injection pulses measure a second pressure of gaseous fuel supplied to the first injector, command a second operation of the first injector comprising one or more longer injection pulses, each of the one or more longer injection pulses having a duration greater that any of the plurality of shorter injection pulses, and after the one or more longer injection pulses measure a third pressure of gaseous fuel supplied to the first injector, diagnose the first injector in response to the first pressure, the second pressure, and the third pressure, and operate the engine to purge gaseous fuel injected during the engine shutdown.

20 Claims, 5 Drawing Sheets

(56) References Cited

U.S. PATENT DOCUMENTS

| | | | | |
|---|---|---|---|---|
| 10,808,639 | B2 | 10/2020 | Faied | |
| 10,954,880 | B1 | 3/2021 | Thomas | |
| 11,591,981 | B2 | 2/2023 | Gillot et al. | |
| 11,781,500 | B2 | 10/2023 | Albing et al. | |
| 2014/0331752 | A1 * | 11/2014 | Hall | F02D 41/0235 73/114.75 |
| 2017/0002761 | A1 * | 1/2017 | Dudar | F02D 41/22 |
| 2017/0082043 | A1 * | 3/2017 | Dudar | F01N 3/101 |
| 2017/0198671 | A1 * | 7/2017 | Dudar | F02M 35/104 |
| 2017/0356393 | A1 * | 12/2017 | Dudar | F02M 25/0809 |
| 2018/0149116 | A1 * | 5/2018 | Cook | F02M 21/0251 |
| 2019/0211726 | A1 * | 7/2019 | Tollefsrud | F01N 3/208 |
| 2019/0291666 | A1 * | 9/2019 | Martin | F02B 29/0468 |
| 2019/0360434 | A1 * | 11/2019 | Dudar | F02M 25/0854 |
| 2020/0141339 | A1 * | 5/2020 | Dudar | B60K 15/03504 |
| 2020/0269680 | A1 * | 8/2020 | Fukui | B60K 15/0406 |
| 2022/0090565 | A1 * | 3/2022 | Diamond | F02M 25/089 |
| 2023/0193840 | A1 * | 6/2023 | Dillen | F02M 21/0293 123/439 |

FOREIGN PATENT DOCUMENTS

| | | | | |
|---|---|---|---|---|
| IN | 482737 | | 12/2023 | |
| WO | WO-2021091613 | A2 * | 5/2021 | F02K 9/48 |
| WO | 2024091784 | | 5/2024 | |
| WO | 2024175948 | | 8/2024 | |

* cited by examiner

GASEOUS FUEL INJECTOR DIAGNOSTICS

BACKGROUND

The present application relates to diagnostic for gaseous fuel injectors and related apparatuses, methods, and systems. A number of proposals have been made for diagnosing operation of fuel injectors utilized in connection with internal combustion engines. Existing proposals suffer from a number of drawbacks, disadvantages, shortcomings, and unmet needs including those respecting accuracy, precision, reliability, robustness, and sufficiency of diagnostic information provided, among others. There remains a significant unmet need for the unique apparatuses, methods, systems, and techniques disclosed herein.

DISCLOSURE OF EXAMPLE EMBODIMENTS

For the purposes of clearly, concisely, and exactly describing example embodiments of the present disclosure, the manner, and method of making and using the same, and to enable the practice, making and use of the same, reference will now be made to certain example embodiments, including those illustrated in the figures, and specific language will be used to describe the same. It shall nevertheless be understood that no limitation of the scope of the invention is thereby created, and that the invention includes and protects such alterations, modifications, and further applications of the example embodiments as would occur to one skilled in the art.

SUMMARY OF THE DISCLOSURE

One embodiment is a unique system for diagnosing one or more gaseous fuel injectors. Another embodiment is a unique process for diagnosing one or more gaseous fuel injectors. Another embodiment is a unique apparatus for diagnosing one or more gaseous fuel injectors. Further embodiments, forms, objects, features, advantages, aspects, and benefits shall become apparent from the following description and drawings.

DETAILED DESCRIPTION OF EXAMPLE EMBODIMENTS

Figure 1:
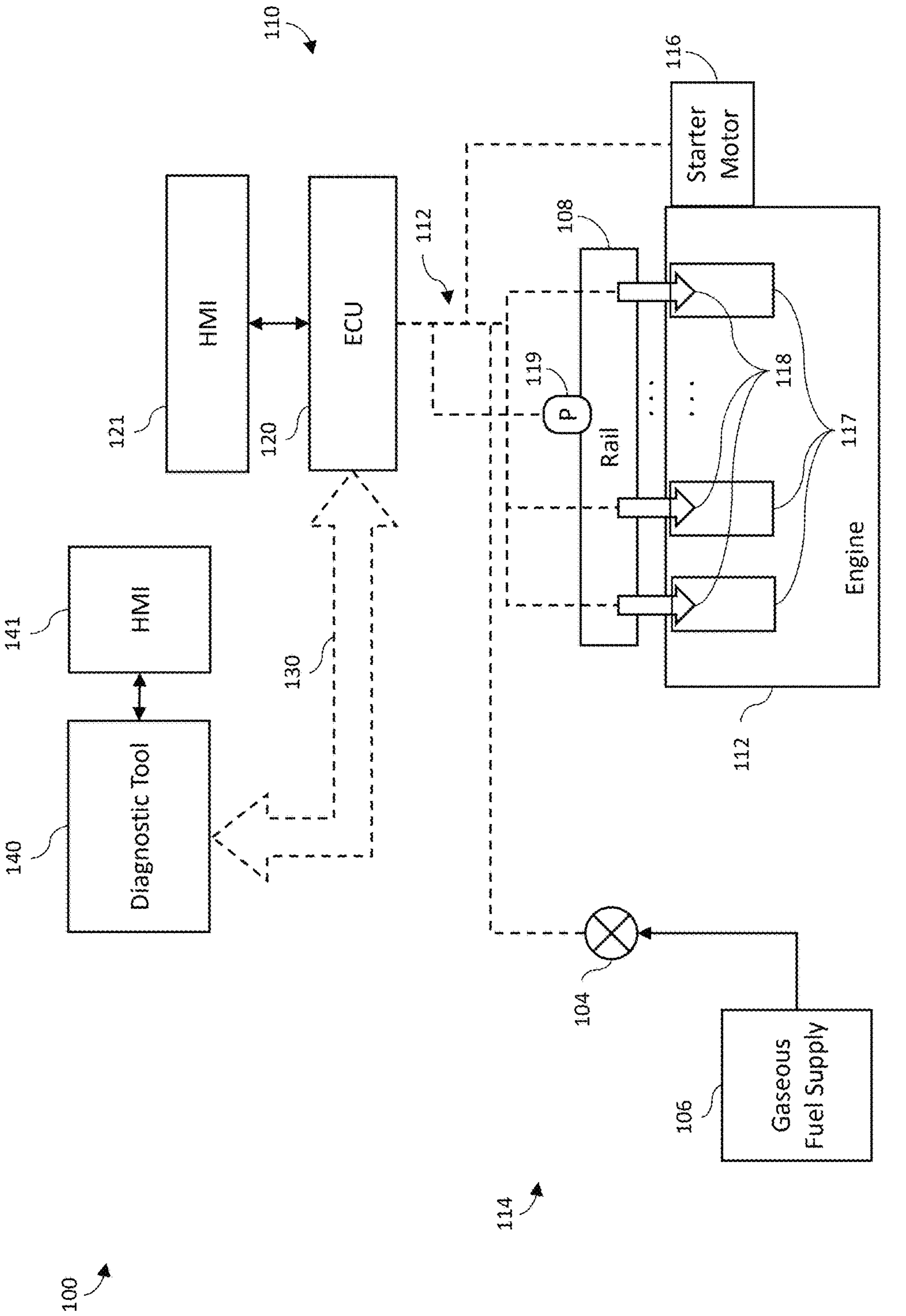
FIG. 1 is a schematic diagram illustrating certain aspects of an example system.

With reference to FIG. 1, there is illustrated a system 100 including a diagnostic tool 140 and an engine system 110. The diagnostic tool 140 may be selectably operatively coupled with and in operative communication with an electronic control unit (ECU) 120 of engine system 110 via one or more communication links 130. Diagnostic tool 140 and communication links 130 may be provided in a number of forms.

In some embodiments, diagnostic tool 140 may be implemented and executed in connection with one or more computing devices present at the location of engine system 110 (e.g., at a service bay or another point-of-service at which engine system 110 is located). In such embodiments, the one or more communication links 130 may include one more physical connections with engine system 110, for example, via an OBD II interface, a J1939 interface, or various other interfaces. Diagnostic tool 140 may be operatively coupled with a human machine interface (HMI) 141 which may comprise one or more displays or screens and/or other input/output devices. The HMI 141 may be locally present at the location of ECU 120 or may be remote therefrom and in operative communication therewith via one or more communication links.

In some embodiments, diagnostic tool 140 may be implemented and executed in connection with one or more computing devices located remotely from engine system 110 and the one or more communication links 130 may include one more networks including wired and/or wireless networks or network components configured and operable to provide communication between diagnostic tool 140 and ECU 120 of engine system 110. Some such embodiments may include one or more computing devices located remotely from engine system 110 and in communication with ECU 120 of engine system 110 via a telematics system. Some such embodiments may include a combination of one or more computing devices located remotely from engine system 110 and one or more computing devices present at the location of engine system 110 (e.g., at a service bay or another point-of-service at which engine system 110 is located). ECU 120 may be operatively coupled with a human machine interface (HMI) 121 which may comprise one or more displays or screens and/or other input/output devices. The HMI 121 may be locally present at the location of ECU 120 or may be remote therefrom and in operative communication therewith via one or more communication links.

While diagnostic tool 140 is depicted in FIG. 1 as external to engine system 110, on some embodiments, diagnostic tool 140 may be embedded or otherwise provide in engine system 110. In some such embodiments, diagnostic tool 140 may be embedded or otherwise provide in and executed by ECU 120 and/or other components of an electronic control system (ECS) of engine system 110. In some such embodiments communication links 130 may include one or more intra-ECU or intra ECS communication channels or may be omitted in instances where a communication link is not required.

Engine system 110 further includes an engine 112, a starter motor 116 operatively coupled with engine 112 and ECU 120, and a fueling system 114 operatively coupled with engine 112 and ECU 120. In the illustrated embodiment engine 112 is a direct-injection, reciprocating piston-type internal combustion engine configured and operable to combust fuel injected by one or more fuel injectors 118 directly into one respective ones of a plurality of combustion cylinders 117. It shall be appreciated that engine 112 may be configured and provided in various forms including various numbers of combustion chambers 117 and various numbers of fuel injectors 118. In some embodiments, the one or more fuel injectors 118 may comprise port injectors configured and operable to inject gaseous fuel into respective port locations of an intake manifold positioned proximate engine intake valve apertures. In some embodiments, the one or more fuel injectors 118 may comprise one or more single point injectors (SPI) configured and operable to inject gaseous into a single location fuel upstream from a plurality of engine intake valve apertures such as a location upstream of an intake manifold. In some embodiments, the one or more fuel injectors 118 may comprise other types of gaseous fuel injectors as will occur to one of skill in the art with the benefit and insight of the present disclosure.

In the illustrated embodiment, fueling system 114 is configured and provided as a high-pressure gaseous fueling system. In other embodiments, fueling system may be provided in various other forms as will occur to one of skill in the art with the benefit and insight of the present disclosure. Fueling system 114 includes fuel rail 108 which receives pressurized fuel from a gaseous fuel supply 106 and provides pressurized fuel to fuel injectors 118. In the illustrated embodiment, gaseous fuel supply 106 is configured and provided as a natural gas fuel supply. In other embodiments, gaseous fuel supply 106 may be configured and provided in other forms, for example, as a hydrogen gas (H2) gaseous fuel supply, a liquefied petroleum gas (LPG) gaseous fuel supply, a wellhead gas gaseous fuel supply, or other types of gaseous fuel supplies as will occur to one of skill in the art with the benefit and insight of the present disclosure.

A fuel shut-off valve (FSOV) 104 is provided at or upstream from an inlet to gaseous fuel supply 106 and is operatively coupled with and controllable by ECU 120 to meter or regulate flow of fuel from gaseous fuel supply 106 to fuel rail 108. It shall be appreciated that FSOV 104 may also be referred to as a volume control valve, flow control valve, magnetic proportional valve, or various other terms of art. It shall be appreciated that fuel rail 108 may be configured in various forms and geometries including, for example, a manifold a plenum, a bore, or other forms as will occur to one of skill in the art with the benefit and insight of the present disclosure.

ECU 120 is in operative communication with and configured to control FSOV 104 between a fully closed position which permits minimum fuel flow to gaseous fuel supply 106 (e.g., substantially no fuel flow) and a fully open position which permits maximum fuel flow to gaseous fuel supply 106.

ECU 120 is also in operative communication with and configured to receive pressure measurements from pressure sensor 119 which is configured to sense pressure of fuel in fuel rail 108. In the illustrated example, pressure sensor 119 is configured and provided as a single pressure sensor configured to sense pressure at a single location of fuel rail 108. In other embodiments, pressure sensor 119 may be configured to sense pressure at other locations intermediate FSOV 104 and the one or more fuel injectors 118. In some such embodiments, multiple pressure sensors may be provided in operative communication with pressure fuel rail 108. In some such embodiments, multiple pressure sensors may be provided in operative communication with multiple ones of the one mor more fuel injectors 118.

ECU 120 is further in operative communication with and configured to control operation of fuel injectors 118 to inject fuel into combustion cylinders 117 of engine 112. ECU 120 is also in operative communication with and configured to provide control signals to selectably operate starter motor 116 to crank engine 112. Control signals to operate starter motor 116 to crank engine 112 may additionally or alternatively be provided in response to a technician commanding or triggering engaging or operation of starter motor 116. In some embodiments an automated starter may be present and may also be controllable via a body control module and may include a push button for manual starting.

ECU 120 is an example of a component of an ECS configured and operable to execute operating logic that defines various control, diagnostic, management, and/or regulation functions. For example, the non-transitory memory medium may be configured with instructions executable by the processor to perform a number of acts, evaluations, or operations including those described herein. The operating logic of ECU 120 or other ECS components may be in the form of dedicated hardware, such as a hardwired state machine, analog calculating machine, programming instructions, and/or a different form as would occur to those skilled in the art.

While ECU 120 is depicted as single unit in the illustrated example, it shall be appreciated that one or more processor, one or more non-transitory memory medium, and related components may be provided as or distributed across or among multiple units or physical packages. For example, one or more processors, such as programmable microprocessors or microcontrollers of a solid-state, integrated circuit type which may be provided in one or more control units and can be implemented in any of a number of ways that combine or distribute the control function across one or more control units in various manners. Other components or subsystems of ECU 120 and/or its associated ECS may also be so configured or provided.

Figure 2:
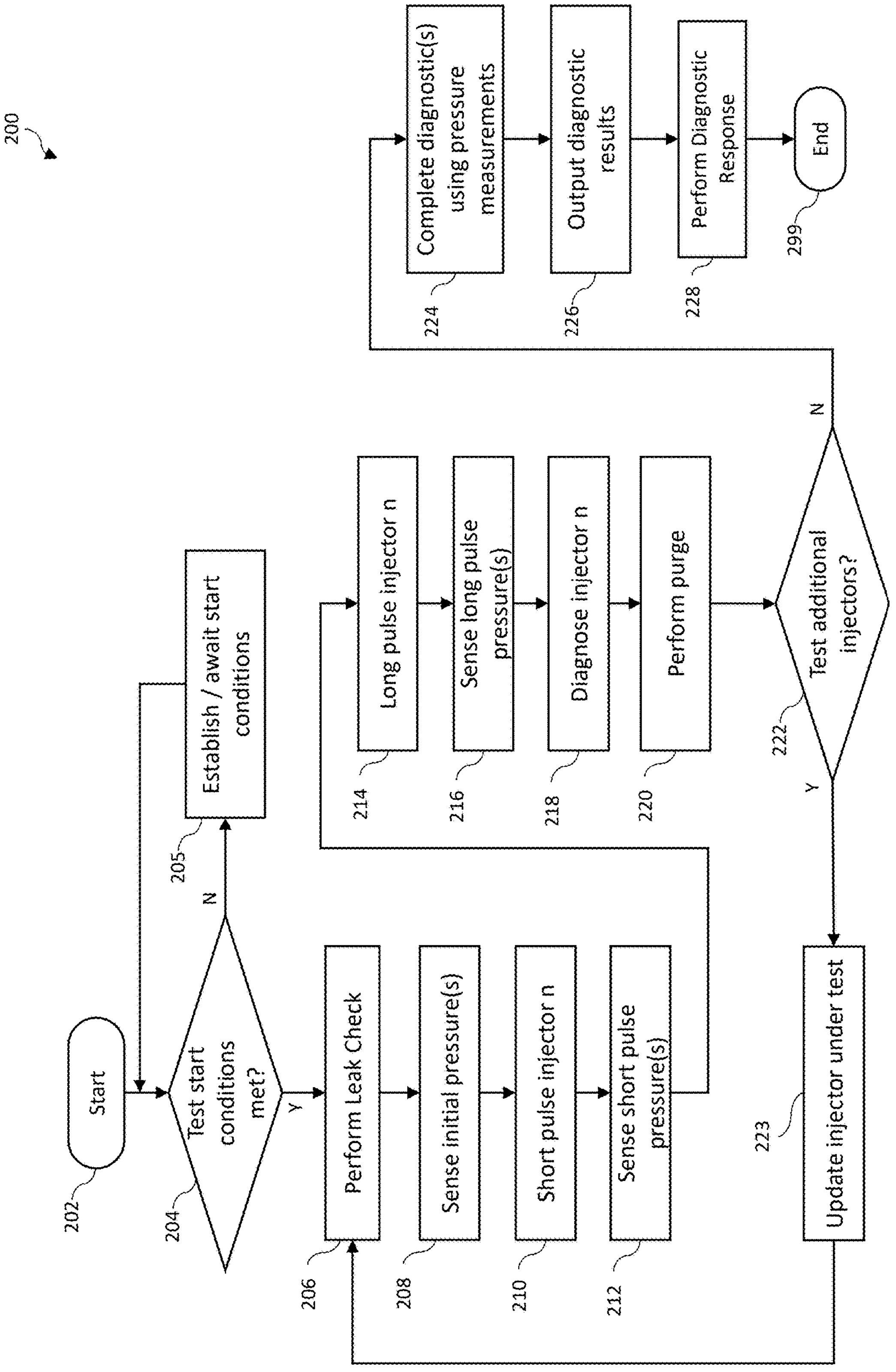
FIG. 2 is a flow diagram illustrating certain aspects of an example process.

With reference to FIG. 2, there is illustrated an example process 200 which may be implemented and performed, in whole or in part, in connection with a system such as system 100. Process 200 is one example of a process according to the present disclosure for performing a diagnostic of one or more fuel injectors, such as one or more of fuel injectors 118. While certain aspects of process 200 are described in connection with system 100 and its constituent elements, it shall be appreciated that process 200 may be implemented and performed in connection with other systems including one or more gaseous fuel injectors.

Process 200 begins at start operation 202 and proceeds to conditional 204 which tests whether one or more test start conditions is or are satisfied. In the illustrated embodiment, the one or more test start conditions include engine 112 being shut down and FSOV 104 being closed or turned off. In other embodiments, the one or more test start conditions may include additional or alternate conditions as will occur to one of skill in the art with the benefit and insight of the present disclosure. For example, in some embodiments, a test process may be started while the engine is idling, out of gear, stationary, or otherwise not needed for positive power output and the test process may be begin by closing a FSOV 104 and stopping engine 112.

If conditional 204 evaluates negative, process 200 proceeds to operation 205 at which process 200 establishes and/or awaits the establishment of the start conditions evaluated by conditional 204. If conditional 204 evaluates affirmative, process 200 proceeds to operation 206 which performs a leak check on fueling system 114. Operation 206 may include receiving a plurality of pressure measurements from pressure sensor 119 and evaluating whether the plurality of pressure measurements are constant or substantially constant. It shall be appreciated that a substantially constant pressure may comprise a pressure that varies only within certain constraints or limits or otherwise exhibit a sufficiently low deviation or variance, for example, such as the ringing between times t0 and t2, times t3 and t4, times t5 and t6, times t7 and t9, times t10 and t11, and times t12 and t13 of curve 310 illustrated in FIG. 4.

From operation 206, process 200 proceeds operation 208 which measures an initial pressure of gaseous fuel supplied to at least a first injector of the one or more gaseous fuel injectors for example, by receiving and storing in non-transitory memory one or more pressure measurements from pressure sensor 119 or another pressure sensor.

From operation 208, process 200 proceeds to operation 210 which commands a first operation of a first injector of a gaseous fuel system, such as a first one or of the one or more fuel injectors 118. The first injector operation includes a plurality of shorter injection pulses. As utilized herein the term shorter injection pulses generally refers to injection pulses utilized to energize or operate a gaseous fuel injector having a duration less that any of one or more longer injection pulses performed by a diagnostic process such as process 200. Such shorter injection pulses may be configured to test opening dynamics of an injector. Such shorter injection pulses may be of sufficiently short duration that an associated injector does not fully open.

From operation 210, process 200 proceeds to operation 212 which measure a second pressure of gaseous fuel supplied to the first injector after the plurality of shorter injection pulses, for example, by receiving and storing in non-transitory memory one or more pressure measurements from pressure sensor 119 or another pressure sensor.

From operation 212, process 200 proceeds to operation 214 which commands a second operation of the first injector. The second operation includes one or more longer injection pulses. As utilized herein the term longer injection pulses generally refers to injection pulses utilized to energize or operate a gaseous fuel injector having a duration greater that any of the plurality of shorter injection pulses performed by a diagnostic process such as process 200. Such shorter injection pulses may be configured to test injector orifice flow. Such longer injection pulses may be of sufficiently long duration that an associated injector fully opens.

From conditional 204, process 200 proceeds to operation 216 which measure a third pressure of gaseous fuel supplied to the first injector after the one or more longer injection pulses, for example, by receiving and storing in non-transitory memory one or more pressure measurements from pressure sensor 119 or another pressure sensor.

From operation 216, process 200 proceeds to operation 218 which diagnoses the first injector. Operation 218 may be configured to diagnose the first injector by evaluating a relationship between a first pressure drop between the first pressure and the second pressure and a first expected pressure drop based on the plurality of shorter injection pulses. In some embodiments, a difference between the first pressure drop and a first expected pressure drop may be evaluated relative to a threshold or predetermined value to provide a pass-fail test result. In other embodiments, other types of test result results may be utilized. It shall be appreciated that the expected pressure drop may be calculated or determined based on a commanded injection quantity, the pressure and temperature conditions associated with the injector being diagnosed, and the relationship therebetween expressed by the ideal gas law. Such evaluation be utilized to test opening dynamics of an injector, for example, to identify sticking or failing injector valves or actuators. In other embodiments, injector pressure drops for a plurality of injectors may be compared to one another and a faulty injector may be diagnosed based on its deviation or variance from the other pressure drops or an average thereof. Such techniques may be utilized, for example, if the pressurized volume after a fuel shut-off valve is not known or now controlled as may occur during vehicle installation, retrofitting, or customization.

Operation 218 may be configured to diagnose the first injector by evaluating a relationship between a second pressure drop between the second pressure and the third pressure and a second expected pressure drop based on the one or more longer injection pulses. In some embodiments, a difference between the second pressure drop and a second expected pressure drop may be evaluated relative to a threshold or predetermined value to provide a pass-fail test result. In other embodiments, other types of test result metrics may be utilized. It shall be appreciated that the expected pressure drop may be calculated or determined based on a commanded injection quantity, the pressure and temperature conditions associated with the injector being diagnosed, and the relationship therebetween expressed by the ideal gas law. Such evaluation be utilized to test orifice flow of an injector, for example, to identify blockages or restrictions on flow through the injector.

It shall be appreciated that operation 218 may be configured to diagnose the first injector in other manners. For example, some embodiments may additionally or alternatively be configured to diagnose the first injector by evaluating a relationship between a first injection quantity corresponding to the pressure drop between the first pressure and the second pressure and a commanded first injection quantity based on the plurality of slower injection pulses. Such embodiments may also be configured to diagnose the first injector by evaluating a relationship between a second injection quantity corresponding to the pressure drop between the second pressure and the third pressure and a commanded second injection quantity based on the one or more longer injection pulses. It shall be appreciated that the measured or observed injection quantities may be calculated or determined based on an observed pressure drop, a fixed volume between the FSOV 104 and the first injector, the temperature conditions associated with the injector being diagnosed, and the relationship therebetween expressed by the ideal gas law.

From operation 218, process 200 proceeds to operation 220 which operates engine 112 to purge gaseous fuel injected during the engine shutdown from engine cylinders intake manifold, and exhaust manifold. Operation 220 may, for example, start engine 112 by energizing starter motor 116 and beginning fueling of engine 112 with fueling system 114. Alternatively, operation 220 may turn over engine 112 by energizing starter motor 116 without beginning fueling of engine 112.

From conditional 220, process 200 proceeds to conditional 222 which evaluates whether to test additional injectors. Conditional 220 may evaluate whether more than one injector is present in system 100. Additionally or alternatively, conditional 222 may evaluate whether additional injectors so far undiagnosed by process 200 are present in system 100. If conditional 222 evaluates affirmative, process 200 proceeds to operation 223 which updates (e.g., changes increments) the fuel injector under test (e.g., by selecting a different one of the one or more fuel injectors 118). From operation 223, process 200 returns to operation 206 (or alternatively to conditional 204 or operation 208) and proceeds as described above, it being appreciated that the aforementioned references to the first fuel injector will apply, mutatis mutandis, to the updated injector under test.

If conditional 222 evaluates negative, process 200 proceeds to operation 224 which completes one or more diagnostics using pressure measurements from the operation of process 200. Operation 224 may, for example, compile, concatenate, distill, summarize, or otherwise process the individual diagnostics determined by operation 218.

From operation 224, process 200 proceeds to operation 226 which outputs diagnostic results. The diagnostic results may be displayed as a human perceptible output indicative a diagnosis of one or more of the one or more injectors under test and may be presented, for example, via HMI 121 and/or HMI 141.

From operation 226, process 200 proceeds to operation 228 which performs one or more diagnostic responses. The one or more diagnostic responses may comprise, for example, derating operation of the engine 112, disabling operation of the engine 112, derating operation of one or more of the fuel injectors 118, disabling operation of one or more of the fuel injectors 118, illuminating a malfunction indicator light (MIL), outputting other visually or audibly perceptible outputs, and/or performing other diagnostic responses as will occur to one of skill in the art with the benefit and insight of the present disclosure. From operation 229, process 200 proceeds to end operation 299 and may thereafter be repeated or recalled.

Figure 3:
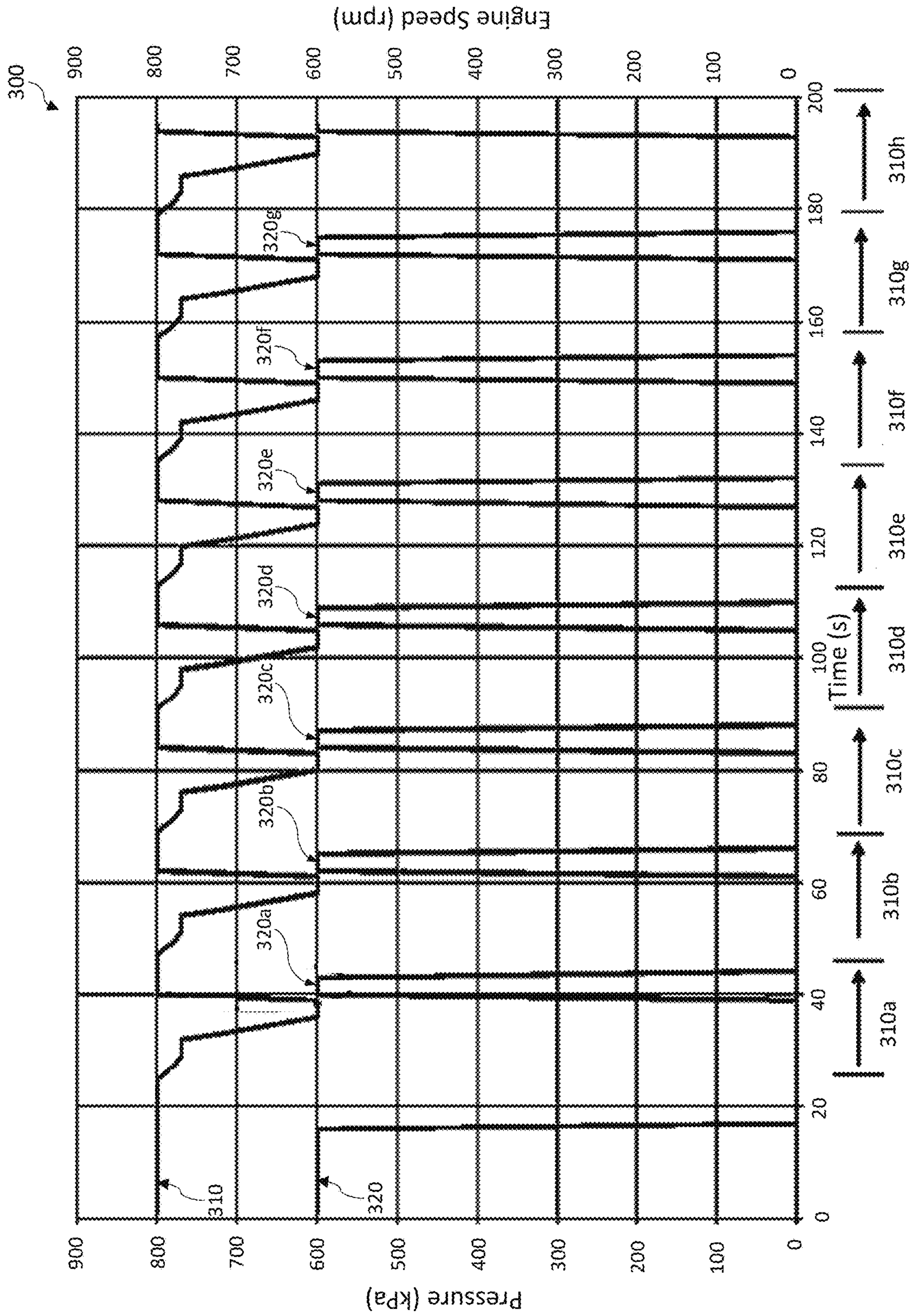
FIG. 3 is a graph illustrating certain aspects of an example test procedure.

With reference to FIG. 3, there is illustrated graph 300 depicting certain aspects of an example test procedure. The example test procedure may, for example, result from operation of process 200 on system 100. Graph 300 depicts injector pressure curve 310 as a function of time. Injector pressure curve 310 includes a plurality of test regions. In test region 310*a* first one of the fuel injectors 118 is diagnosed. In test region 310*b* a second one of the fuel injectors 118 is diagnosed. In test region 310*c* a third one of the fuel injectors 118 is diagnosed. In test region 310*d* a fourth one of the fuel injectors 118 is diagnosed. In test region 310*e* a fifth one of the fuel injectors 118 is diagnosed. In test region 310*f* a sixth one of the fuel injectors 118 is diagnosed. In test region 310*g* a seventh one of the fuel injectors 118 is diagnosed, and test region 310*h* an eighth one of the fuel injectors 118 is diagnosed.

Graph 300 further depicts engine speed curve 320 as a function of time. Engine speed curve 320 includes a plurality of engine operations configured to purge gaseous injected during the plurality of test regions. Engine operation 320*a* is utilized to purge engine 112 of gaseous fuel introduced by an injector during test region 310*a*. Engine operation 320*b* is utilized to purge engine 112 of gaseous fuel introduced by an injector during test region 310*b*. Engine operation 320*c* is utilized to purge engine 112 of gaseous fuel introduced by an injector during test region 310*c*. Engine operation 320*d* is utilized to purge engine 112 of gaseous fuel introduced by an injector during test region 310*d*. Engine operation 320*e* is utilized to purge engine 112 of gaseous fuel introduced by an injector during test region 310*e*. Engine operation 320*f* is utilized to purge engine 112 of gaseous fuel introduced by an injector during test region 310*f*. Engine operation 320*g* is utilized to purge engine 112 of gaseous fuel introduced by an injector during test region 310*g*. Engine operation 320*h* is utilized to purge engine 112 of gaseous fuel introduced by an injector during test region 310*h*.

Figure 4:
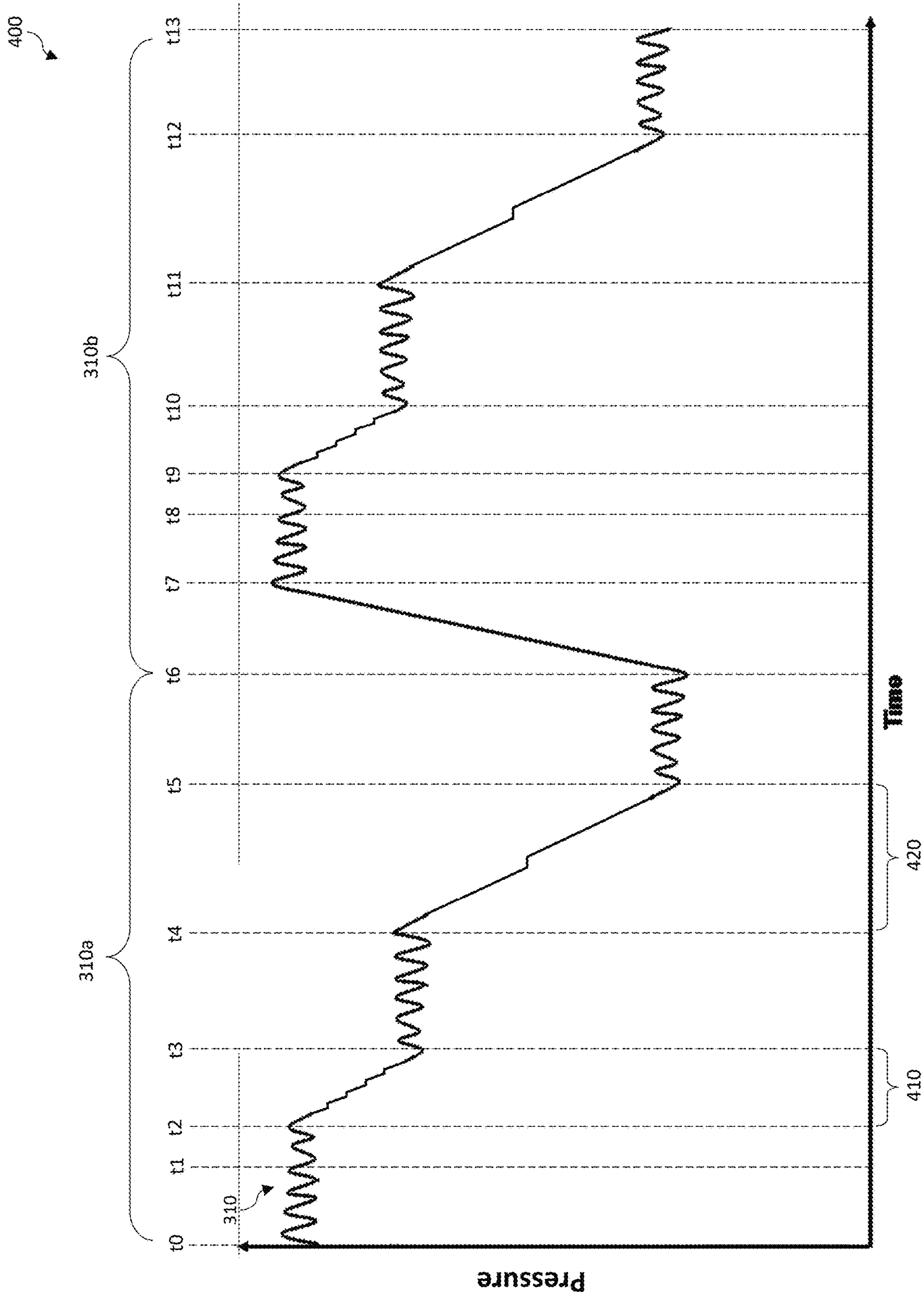
FIG. 4 is a graph illustrating further details a portion of the graph of FIG. 3.

With reference to FIG. 4, there is illustrated graph 400 depicting an enlarged portion of curve 320 in test region 310*a* and test region 310*b*. A plurality of times t0-t13 are depicted on graph 400 to denote regions in which different operations of process 200 are performed. It shall be appreciated that the description of an operation or act being performed between two of the plurality of times t0-t13 includes and encompasses such operation or act being performed during the entire duration between the two times as well as during only a portion of the duration between the two times.

Process 200 or another diagnostic may be initiated at time t0 when engine 112 is shut down and FSOV 104 is closed or turned off. Between time t0 and time t1, a leak check is performed on fueling system 114. Between time t1 and time t2, a first pressure of gaseous fuel supplied to at least a first injector is measured. Between time t2 and time t3, a first operation of the first injector comprising a plurality of shorter injection pulses is commanded. Between time t3 and time t4, after the plurality of shorter injection pulses, a second pressure of gaseous fuel supplied to the first injector is measured. Between time t4 and time t5, a second operation of the first injector comprising one or more longer injection pulses is commanded. Between time t5 and time t6, after the one or more longer injection pulses, a third pressure of gaseous fuel supplied to the first injector is measured. Between time t6 and time t7, engine 112 is operated to purge gaseous fuel injected during the engine shutdown.

Between time t7 and t13, substantially similar operations as those occurring between time t1 and t7 occur. Between time t7 and time t8, the operations occurring between time t1 and t2 occur. Between time t8 and time t9, the operations occurring between time t2 and t3 occur. Between time t9 and time t10, the operations occurring between time t3 and t4 occur. Between time t10 and time t11, the operations occurring between time t4 and t5 occur. Between time t11 and time t12, the operations occurring between time t5 and t6 occur. Between time t12 and time t13, the operations occurring between time t6 and t7 occur.

Figure 5:
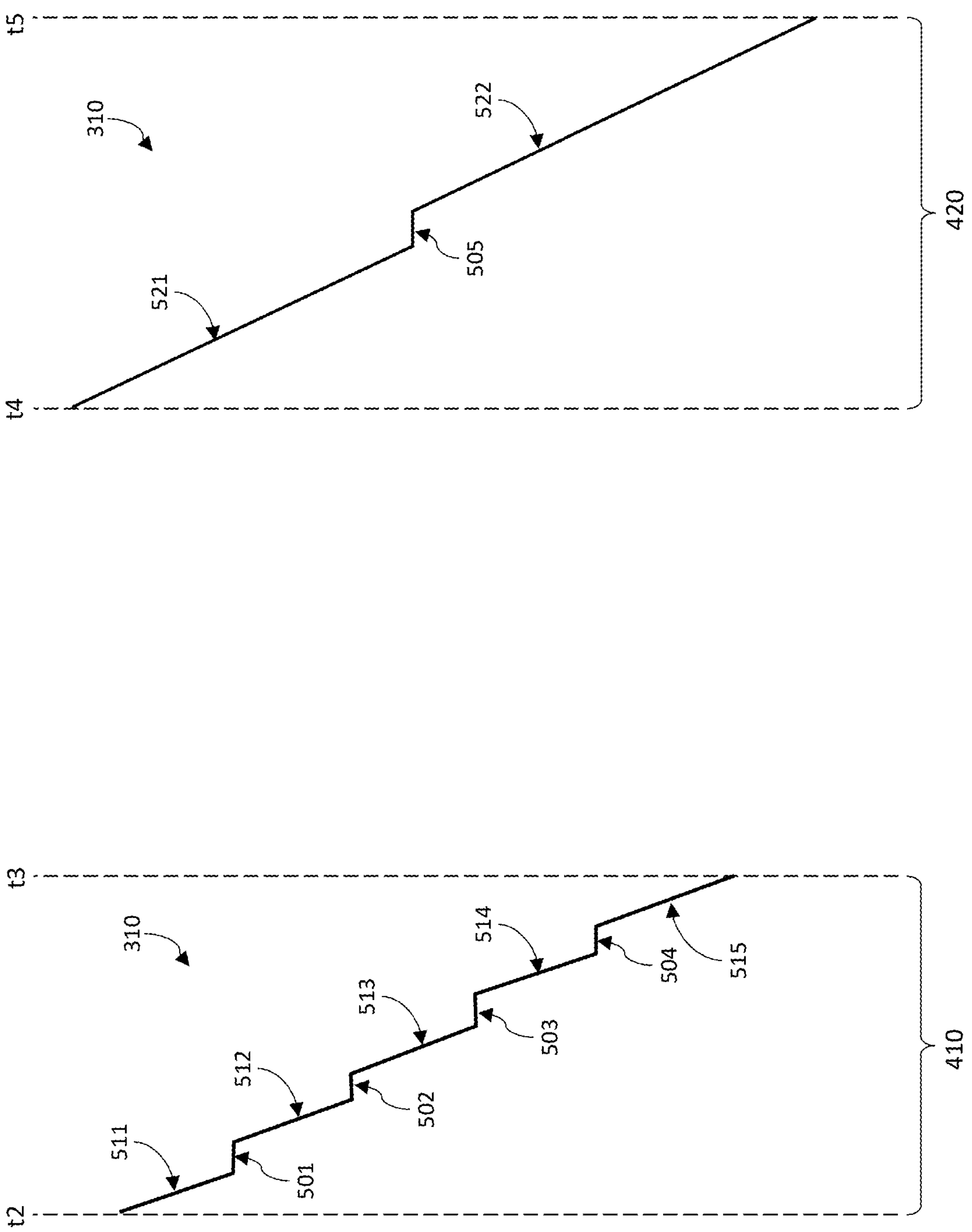
FIG. 5 is a graph illustrating further details a portion of the graph of FIG. 4.

With reference to FIG. 5, there are illustrated enlarged views of test segment 410 and test segment 420 of test region 310*a* of graph 400. Test segment 410 includes a plurality of shorter injection pulses 511-515 which are separated by a plurality of non-pulse or delay periods 501-504. In the illustrated example, the plurality of shorter injection pulses 511-515 comprise five injection pulses which provide a desired signal to noise ratio. In other embodiments, the plurality of shorter injection pulses may comprise a greater or lesser number of injection pulses.

Test segment 420 includes longer injection pulse 521 and longer injection pulse 522 which are separated by a non-pulse or delay period 505. In the illustrated example, two longer injection pulses are performed which provide a desired signal to noise ratio. In other embodiments, the plurality of shorter injection pulses may comprise a greater or lesser number of injection pulses.

It shall be further appreciated that the illustrated durations between times t0-t13 may vary from the illustrated example, for example, the pressure drops (e.g., t2-t3, t4-t5, t9-t10, and t11-*t*12 in FIG. 4 and the similar pressure drops illustrated in FIG. 3) may be shorter in duration than illustrated and the pressure regions of substantially constant pressure (e.g., t0-t2, t3-t4, t5-t6, t7-t9, and t12-*t*13 in FIG. 4 and the similar regions of substantially constant pressure illustrated in FIG. 3) may be of longer duration than illustrated.

As illustrated by this detailed description, the present disclosure contemplates multiple and various embodiments, including, without limitation, the following example embodiments.

Example embodiment number 1 is a system comprising: an engine; one or more gaseous fuel injectors configured to inject gaseous fuel for combustion by the engine; and an electronic control system configured to: perform an engine shutdown; during the engine shutdown measure a first pressure of gaseous fuel supplied to at least a first injector of the one or more gaseous fuel injectors, command a first operation of the first injector comprising a plurality of shorter injection pulses, after the plurality of shorter injection pulses measure a second pressure of gaseous fuel supplied to the first injector, command a second operation of the first injector comprising one or more longer injection pulses, each of the one or more longer injection pulses having a duration greater that any of the plurality of shorter injection pulses, and after the one or more longer injection pulses measure a third pressure of gaseous fuel supplied to the first injector; diagnose the first injector in response to the first pressure, the second pressure, and the third pressure; and operate the engine to purge gaseous fuel injected during the engine shutdown.

Example embodiment number 2 includes the features of example embodiment number 1, wherein the electronic control system is configured to measure the first pressure, the second pressure, and the third pressure using a pressure sensor operatively coupled with a fuel rail configured to supply gaseous fuel to the or more gaseous fuel injectors.

Example embodiment number 3 includes the features of example embodiment number 1, wherein the electronic control system is configured to measure the first pressure, the second pressure, and the third pressure using a pressure sensor operatively coupled with the first injector.

Example embodiment number 4 includes the features of example embodiment number 1, wherein the electronic control system is configured to diagnose the first injector by evaluating a relationship between a first pressure drop between the first pressure and the second pressure and a first expected pressure drop based on the plurality of shorter injection pulses.

Example embodiment number 5 includes the features of example embodiment number 4, wherein the electronic control system is configured to diagnose the first injector by evaluating a relationship between a second pressure drop between the second pressure and the third pressure and a second expected pressure drop based on the one or more longer injection pulses.

Example embodiment number 6 includes the features of example embodiment number 1, wherein the electronic control system is configured to diagnose the first injector by evaluating a relationship between a first fueling quantity corresponding to a pressure drop between the first pressure and the second pressure and a commanded injection quantity corresponding to the plurality of shorter injection pulses.

Example embodiment number 7 includes the features of example embodiment number 6, wherein the electronic control system is configured to diagnose the first injector by evaluating a relationship between a second fueling quantity corresponding to a pressure drop between the second pressure and the third pressure and a second injection quantity corresponding to the one or more longer injection pulses.

Example embodiment number 8 includes the features of example embodiment number 1, wherein the electronic control system is configured to at least one of display a human perceptible output indicative a diagnosis of the first injector, and transmit a message to a location remote from the electronic control system indicative the diagnosis of the first injector.

Example embodiment number 9 includes the features of example embodiment number 1, wherein the electronic control system is configured to perform a leak check prior to performing the first injection operation including measuring a preliminary pressure of gaseous fuel supplied to at least a first injector of the one or more gaseous fuel injectors.

Example embodiment number 10 includes the features of example embodiment number 1, wherein the electronic control system is configured to: perform a second engine shutdown; during the second engine shutdown measure a fourth pressure of gaseous fuel supplied to at least a second injector of the one or more gaseous fuel injectors, command a first operation of the second injector comprising a second plurality of shorter injection pulses, after the second plurality of shorter injection pulses measure a fifth pressure of gaseous fuel supplied to the second injector, command a second operation of the second injector comprising a second one or more longer injection pulses, each of the second one or more longer injection pulses having a duration greater that any of the second plurality of shorter injection pulses, and after the second one or more longer injection pulses measure a sixth pressure of gaseous fuel supplied to the first injector; diagnose the second one of the one or more gaseous fuel injectors in response to the fourth pressure, the fifth pressure, and the sixth pressure; and operate the engine to purge gaseous fuel injected during the second engine shutdown.

Example embodiment number 11 is a process for testing one or more gaseous fuel injectors configured to inject gaseous fuel to an engine, the process comprising: operating an electronic control system to perform acts of: performing an engine shutdown; during the engine shutdown measuring a first pressure of gaseous fuel supplied to at least a first injector of the one or more gaseous fuel injectors, commanding a first operation of the first injector comprising a plurality of shorter injection pulses, after the plurality of shorter injection pulses measuring a second pressure of gaseous fuel supplied to the first injector, commanding a second operation of the first injector comprising one or more longer injection pulses, each of the one or more longer injection pulses having a duration greater that any of the plurality of shorter injection pulses, and after the one or more longer injection pulses measuring a third pressure of gaseous fuel supplied to the first injector; diagnosing the first injector in response to the first pressure, the second pressure, and the third pressure; and operating the engine to purge gaseous fuel injected during the engine shutdown.

Example embodiment number 12 includes the features of example embodiment number 11, wherein the acts of measuring the first pressure, measuring the second pressure, and measuring the third pressure are performed, comprise measuring gaseous fuel pressure of a fuel rail configured to supply gaseous fuel to the or more gaseous fuel injectors.

Example embodiment number 13 includes the features of example embodiment number 11, wherein the acts of measuring the first pressure, measuring the second pressure, and measuring the third pressure are performed, comprise measuring gaseous fuel pressure of the first injector.

Example embodiment number 14 includes the features of example embodiment number 11, wherein the act of diagnosing comprises evaluating a relationship between a first pressure drop between the first pressure and the second pressure and a first expected pressure drop based on the plurality of shorter injection pulses.

Example embodiment number 15 includes the features of example embodiment number 14, wherein the act of diagnosing further comprises evaluating a relationship between a second pressure drop between the second pressure and the third pressure and a second expected pressure drop based on the one or more longer injection pulses.

Example embodiment number 16 includes the features of example embodiment number 11, wherein the act of diagnosing comprises evaluating a relationship between a first fueling quantity corresponding to a pressure drop between the first pressure and the second pressure and a commanded injection quantity corresponding to the plurality of shorter injection pulses.

Example embodiment number 17 includes the features of example embodiment number 16, wherein the act of diagnosing further comprises evaluating a relationship between a second fueling quantity corresponding to a pressure drop between the second pressure and the third pressure and a second injection quantity corresponding to the one or more longer injection pulses.

Example embodiment number 18 includes the features of example embodiment number 11, wherein the act of diagnosing comprises at least one of displaying a human perceptible output indicative a diagnosis of the first injector, and transmitting a message to a location remote from the electronic control system indicative the diagnosis of the first injector.

Example embodiment number 19 includes the features of example embodiment number 11, comprising: performing a leak check prior to performing the first injection operation including measuring a preliminary pressure of gaseous fuel supplied to at least a first injector of the one or more gaseous fuel injectors.

Example embodiment number 20 includes the features of example embodiment number 11, comprising: operating the electronic control system to perform acts of: performing a second engine shutdown; during the second engine shutdown measuring a fourth pressure of gaseous fuel supplied to at least a second injector of the one or more gaseous fuel injectors, commanding a first operation of the second injector comprising a second plurality of shorter injection pulses, after the second plurality of shorter injection pulses measuring a fifth pressure of gaseous fuel supplied to the second injector, commanding a second operation of the second injector comprising a second one or more longer injection pulses, each of the second one or more longer injection pulses having a duration greater that any of the second plurality of shorter injection pulses, and after the second one or more longer injection pulses measuring a sixth pressure of gaseous fuel supplied to the first injector; diagnosing the second one of the one or more gaseous fuel injectors in response to the fourth pressure, the fifth pressure, and the sixth pressure; and operating the engine to purge gaseous fuel injected during the second engine shutdown.

While example embodiments of the disclosure have been illustrated and described in detail in the drawings and foregoing description, the same is to be considered as illustrative and not restrictive in character, it being understood that only certain example embodiments have been shown and described and that all changes and modifications that come within the spirit of the claimed inventions are desired to be protected. It should be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A system comprising:

an engine;

one or more gaseous fuel injectors configured to inject gaseous fuel for combustion by the engine; and an electronic control system configured to:

perform an engine shutdown;

during the engine shutdown measure a first pressure of gaseous fuel supplied to at least a first injector of the one or more gaseous fuel injectors, command a first operation of the first injector comprising a plurality of shorter injection pulses, after the plurality of shorter injection pulses measure a second pressure of gaseous fuel supplied to the first injector, command a second operation of the first injector comprising one or more longer injection pulses, each of the one or more longer injection pulses having a duration greater that any of the plurality of shorter injection pulses, and after the one or more longer injection pulses measure a third pressure of gaseous fuel supplied to the first injector;

diagnose the first injector in response to the first pressure, the second pressure, and the third pressure; and operate the engine to purge gaseous fuel injected during the engine shutdown.

2. The system of claim 1, wherein the electronic control system is configured to measure the first pressure, the second pressure, and the third pressure using a pressure sensor operatively coupled with a fuel rail configured to supply gaseous fuel to the or more gaseous fuel injectors.

3. The system of claim 1, wherein the electronic control system is configured to measure the first pressure, the second pressure, and the third pressure using a pressure sensor operatively coupled with the first injector.

4. The system of claim 1, wherein the electronic control system is configured to diagnose the first injector by evaluating a relationship between a first pressure drop between the first pressure and the second pressure and a first expected pressure drop based on the plurality of shorter injection pulses.

5. The system of claim 4, wherein the electronic control system is configured to diagnose the first injector by evaluating a relationship between a second pressure drop between the second pressure and the third pressure and a second expected pressure drop based on the one or more longer injection pulses.

6. The system of claim 1, wherein the electronic control system is configured to diagnose the first injector by evaluating a relationship between a first fueling quantity corresponding to a pressure drop between the first pressure and the second pressure and a commanded injection quantity corresponding to the plurality of shorter injection pulses.

7. The system of claim 6, wherein the electronic control system is configured to diagnose the first injector by evaluating a relationship between a second fueling quantity corresponding to a pressure drop between the second pressure and the third pressure and a second injection quantity corresponding to the one or more longer injection pulses.

8. The system of claim 1, wherein the electronic control system is configured to at least one of display a human perceptible output indicative a diagnosis of the first injector, and transmit a message to a location remote from the electronic control system indicative the diagnosis of the first injector.

9. The system of claim 1, wherein the electronic control system is configured to perform a leak check prior to performing the first injection operation including measuring a preliminary pressure of gaseous fuel supplied to at least a first injector of the one or more gaseous fuel injectors.

10. The system of claim 1, wherein the electronic control system is configured to:

perform a second engine shutdown;

during the second engine shutdown measure a fourth pressure of gaseous fuel supplied to at least a second injector of the one or more gaseous fuel injectors, command a first operation of the second injector comprising a second plurality of shorter injection pulses, after the second plurality of shorter injection pulses measure a fifth pressure of gaseous fuel supplied to the second injector, command a second operation of the second injector comprising a second one or more longer injection pulses, each of the second one or more longer injection pulses having a duration greater that any of the second plurality of shorter injection pulses, and after the second one or more longer injection pulses measure a sixth pressure of gaseous fuel supplied to the first injector;

diagnose the second one of the one or more gaseous fuel injectors in response to the fourth pressure, the fifth pressure, and the sixth pressure; and operate the engine to purge gaseous fuel injected during the second engine shutdown.

11. A process for testing one or more gaseous fuel injectors configured to inject gaseous fuel to an engine, the process comprising:

operating an electronic control system to perform acts of:

performing an engine shutdown;

during the engine shutdown measuring a first pressure of gaseous fuel supplied to at least a first injector of the one or more gaseous fuel injectors, commanding a first operation of the first injector comprising a plurality of shorter injection pulses, after the plurality of shorter injection pulses measuring a second pressure of gaseous fuel supplied to the first injector, commanding a second operation of the first injector comprising one or more longer injection pulses, each of the one or more longer injection pulses having a duration greater that any of the plurality of shorter injection pulses, and after the one or more longer injection pulses measuring a third pressure of gaseous fuel supplied to the first injector;

diagnosing the first injector in response to the first pressure, the second pressure, and the third pressure; and operating the engine to purge gaseous fuel injected during the engine shutdown.

12. The process of claim 11, wherein the acts of measuring the first pressure, measuring the second pressure, and measuring the third pressure are performed, comprise measuring gaseous fuel pressure of a fuel rail configured to supply gaseous fuel to the or more gaseous fuel injectors.

13. The process of claim 11, wherein the acts of measuring the first pressure, measuring the second pressure, and measuring the third pressure are performed, comprise measuring gaseous fuel pressure of the first injector.

14. The process of claim 11, wherein the act of diagnosing comprises evaluating a relationship between a first pressure drop between the first pressure and the second pressure and a first expected pressure drop based on the plurality of shorter injection pulses.

15. The process of claim 14, wherein the act of diagnosing further comprises evaluating a relationship between a second pressure drop between the second pressure and the third pressure and a second expected pressure drop based on the one or more longer injection pulses.

16. The process of claim 11, wherein the act of diagnosing comprises evaluating a relationship between a first fueling quantity corresponding to a pressure drop between the first pressure and the second pressure and a commanded injection quantity corresponding to the plurality of shorter injection pulses.

17. The process of claim 16, wherein the act of diagnosing further comprises evaluating a relationship between a second fueling quantity corresponding to a pressure drop between the second pressure and the third pressure and a second injection quantity corresponding to the one or more longer injection pulses.

18. The process of claim 11, wherein the act of diagnosing comprises at least one of displaying a human perceptible output indicative a diagnosis of the first injector, and transmitting a message to a location remote from the electronic control system indicative the diagnosis of the first injector.

19. The process of claim 11, comprising: performing a leak check prior to performing the first injection operation including measuring a preliminary pressure of gaseous fuel supplied to at least a first injector of the one or more gaseous fuel injectors.

20. The process of claim 11, comprising:

operating the electronic control system to perform acts of:

performing a second engine shutdown;

during the second engine shutdown measuring a fourth pressure of gaseous fuel supplied to at least a second injector of the one or more gaseous fuel injectors, commanding a first operation of the second injector comprising a second plurality of shorter injection pulses, after the second plurality of shorter injection pulses measuring a fifth pressure of gaseous fuel supplied to the second injector, commanding a second operation of the second injector comprising a second one or more longer injection pulses, each of the second one or more longer injection pulses having a duration greater that any of the second plurality of shorter injection pulses, and after the second one or more longer injection pulses measuring a sixth pressure of gaseous fuel supplied to the first injector;

diagnosing the second one of the one or more gaseous fuel injectors in response to the fourth pressure, the fifth pressure, and the sixth pressure; and operating the engine to purge gaseous fuel injected during the second engine shutdown.

* * * * *